United States Patent [19]

Becker

[11] 4,383,545
[45] May 17, 1983

[54] AUTOMATIC DRAIN SYSTEM FOR COMPRESSED AIR SYSTEMS AND THE LIKE

[75] Inventor: Philip S. Becker, Erie, Pa.
[73] Assignee: Valex, Inc., Erie, Pa.
[21] Appl. No.: 249,030
[22] Filed: Mar. 30, 1981
[51] Int. Cl.³ .............................................. G05F 11/22
[52] U.S. Cl. ................. 137/204; 137/624.13; 222/368
[58] Field of Search ................... 137/203, 204, 624.13, 137/624.15; 222/368, 370

[56] References Cited

U.S. PATENT DOCUMENTS

| | | | |
|---|---|---|---|
| 841,111 | 1/1907 | Bromley | 222/368 X |
| 3,446,404 | 5/1969 | Mehta | 222/368 X |
| 4,058,240 | 11/1977 | Becker | 222/368 |
| 4,135,542 | 1/1979 | Chisholm | 137/204 |

Primary Examiner—Alan Cohan
Attorney, Agent, or Firm—Ralph Hammar

[57] ABSTRACT

An improvement on U.S. Pat. No. 4,058,240 in which the condensate is collected in cavities in the valve member having open ends on opposite sides of a plane normal to the valve member and perpendicular to its axis of rotation. The inner ends of the cavities intersect a vent opening extending along the axis of the valve member. The material of the valve member between the cavities provides better support for the valve seals. The vent provides more rapid drainage of the cavities so the cavities are substantially completely emptied each revolution, thereby increasing the drainage capacity of the device. The ball valve member could be hollow, in which case the entire interior of the ball would be available for collecting condensate.

11 Claims, 9 Drawing Figures

U.S. Patent    May 17, 1983    Sheet 1 of 3    4,383,545
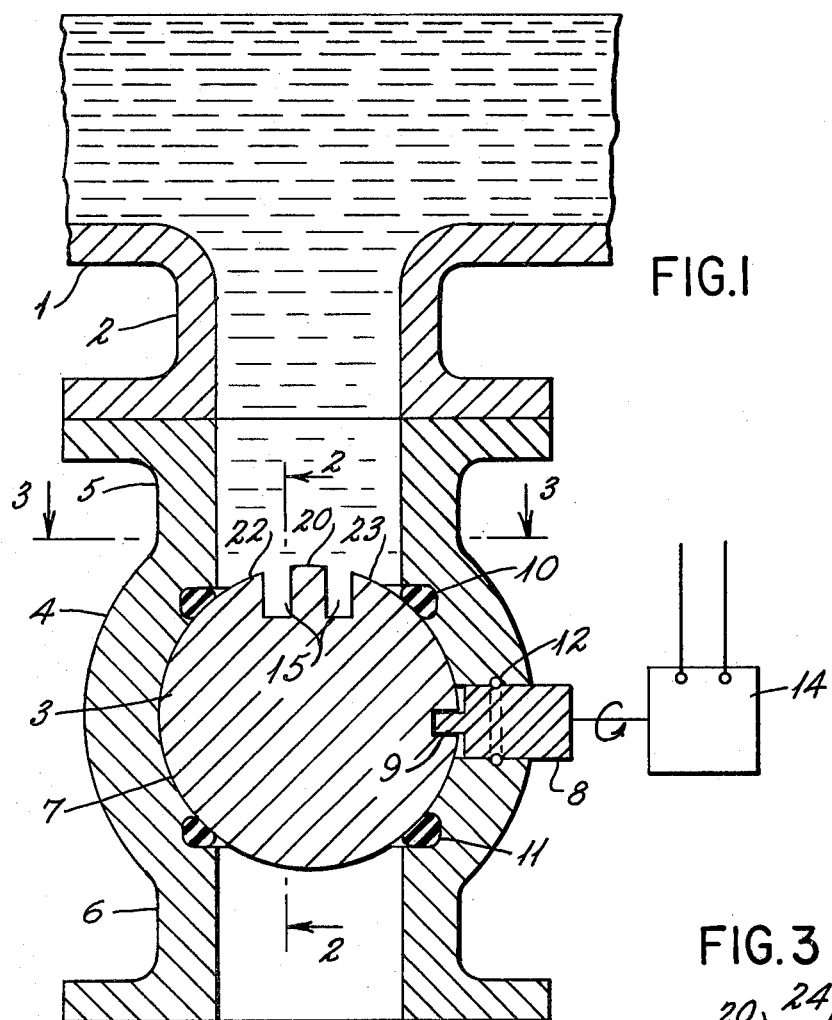
FIG.1
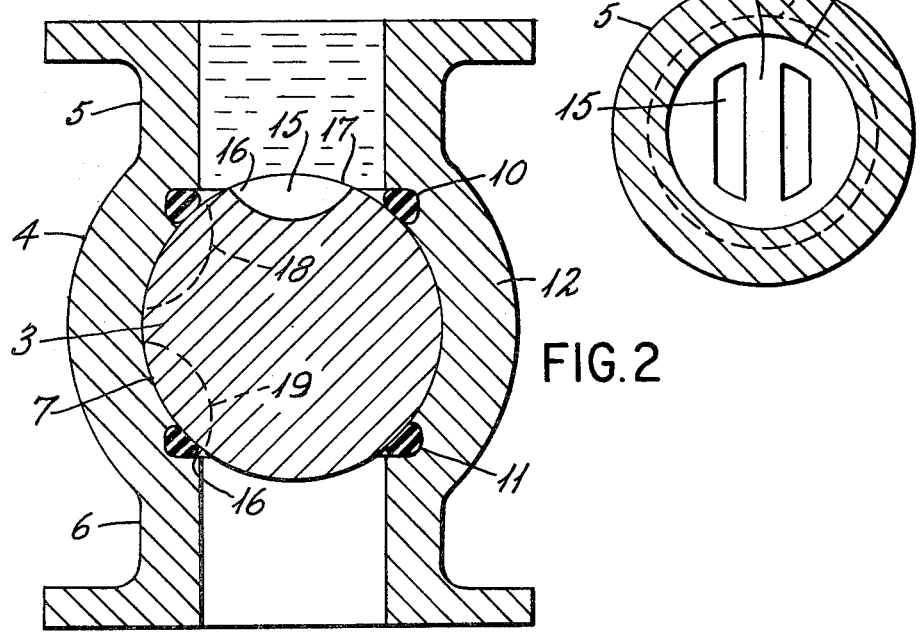
FIG.2
FIG.3

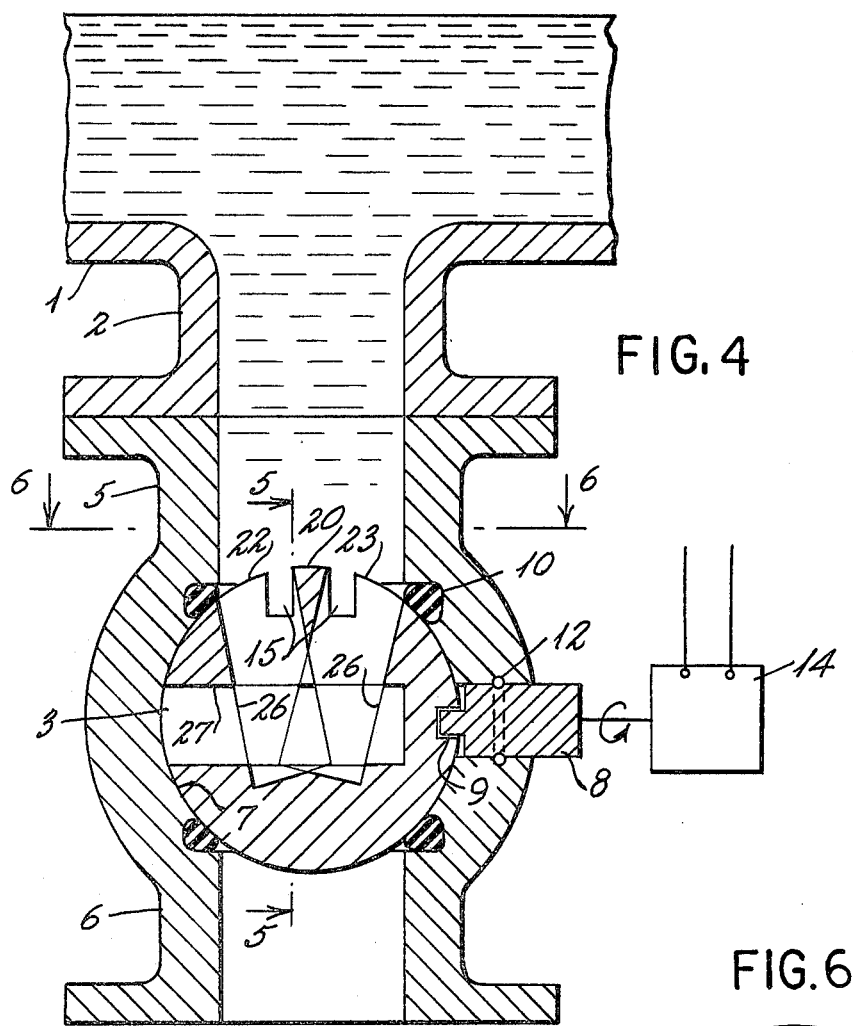
FIG. 4
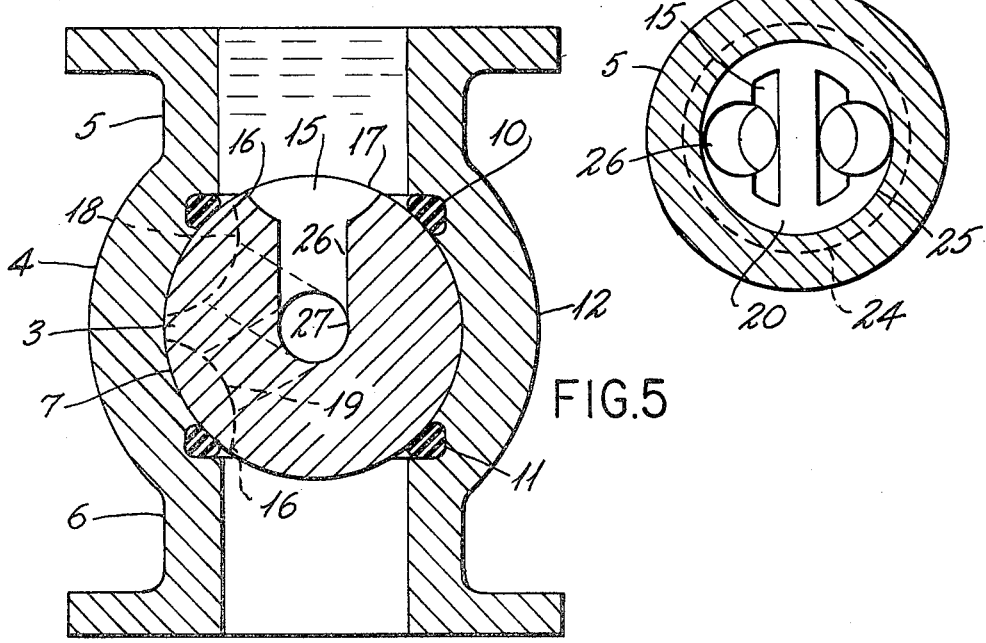
FIG. 6
FIG. 5

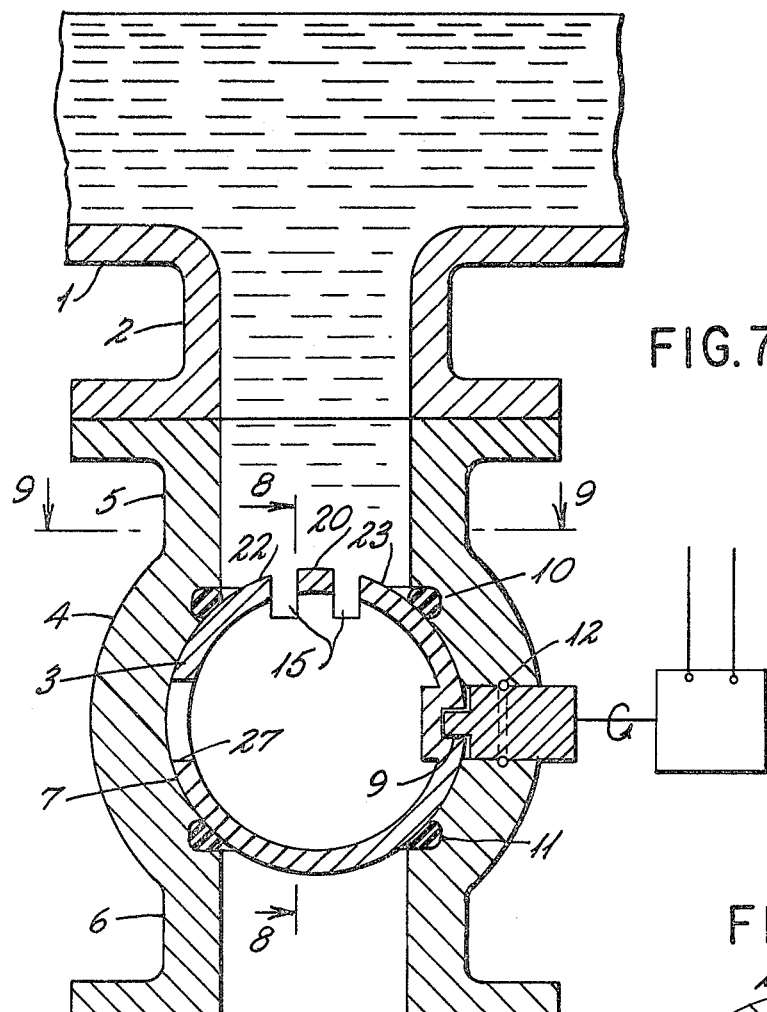
FIG. 7
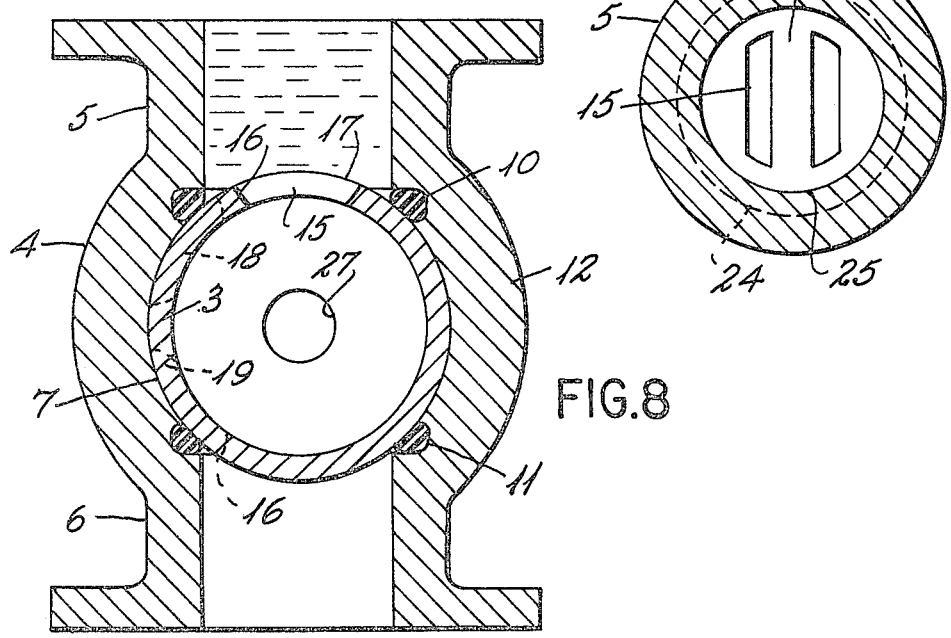
FIG. 9
FIG. 8

AUTOMATIC DRAIN SYSTEM FOR COMPRESSED AIR SYSTEMS AND THE LIKE

This invention is intended to improve patent 4,058,240 by providing better support for the seals of the ball valve member and by increasing the speed of drainage, a feature of great importance in draining thick sludges which accumulate in some condensates.

In the drawing,

FIG. 1 shows a drainage system for compressed air dryers, aftercoolers and the like;

FIG. 2 is a section on line 2—2 of FIG. 1;

FIG. 3 is a section on line 3—3 of FIG. 1;

FIG. 4 shows a modification of the drainage system with increased drainage capacity;

FIG. 5 is a section on line 5—5 of FIG. 4;

FIG. 6 is a section on line 6—6 of FIG. 4;

FIG. 7 shows another modification of a drainage system with increased capacity;

FIG. 8 is a section on line 8—8 of FIG. 7, and

FIG. 9 is a section on line 9—9 of FIG. 7.

In the drawing, the numeral 1 indicates the sump of a compressed air dryer, aftercooler, separator or the like having a drain 2 in its lowermost part. During operation of the compressed air system, moisture is removed from the compressed air and settles into the sump. Heretofore excess accumulation of liquid in the sump has been prevented by periodically opening a drain valve and allowing the compressed air to force the liquid out through the drain 2. This has caused a substantial loss of compressed air, plus violent broadcast of accumulated liquids, solids, etc. This loss of compressed air is prevented by draining the sump through a rotary valve 3, such as a ball valve which is specially designed to block the flow of compressed air in all positions of the valve. The valve has a body 4 with an inlet 5 connected to the drain and an outlet 6 for connection to a suitable drain line or open bucket. The need for a drain line is eliminated as there is never any massive discharge of the combined compressed gas and accumulated liquid or slurry. In the body of the valve is a ball 7 rotatable by a spindle 8 having a tongue and slot driving connection 9 to the ball. Annular seals 10 and 11 prevent leakage between the ball and the body and a seal 12 prevents leakage around the stem. The stem 8 is driven by a geared electric motor 14 providing a very slow and continuous rotation approximately one to ten R.P.M. An in line pressure switch starts the motor when the system is pressurized and stops the motor only when the system is depressurized. A compressed gas operated motor may be substituted for the electric motor. Automatic drain valves now on the market using floats or other controls for the liquid level in the sump are not reliable under the conditions which exist in compressed air and gas systems.

The ball has circumferentially extending slots 15 each having ends 16, 17 spaced on opposite sides of a plane through the axis of rotation of the ball. The slots are spaced on opposite sides of a plane through the center of the ball and normal to said axis. The bottoms of the slots are preferably semicircular as in a Woodruff key. The spacing between the slots is substantially the same as the width of the slots. The length of the slots is less than the inside diameter of the seals 10 and 11 and is also less than the spacing between the seals 10 and 11. The slots can therefore occupy four central positions with respect to the seals, one in each quadrant, in each of which both ends of the slots are spaced from the seals. When the slots are uppermost and centered as shown in full lines in FIGS. 1 and 2, the slots are open and presented to the liquid in the sump. When the stem 8 is rotated 180° from the position shown, the slots will be inverted and the liquid contained in the slots emptied by gravity. In passing from the upright to the inverted positions, the slots pass through an intermediate position in which the open tops of the slots are between the seals 10 and 11 which prevent loss of compressed air and also hold all of the liquid within the slots. Seals 10 and 11 block the flow of compressed air in all positions of the ball. So long as any part of an open end of the slots is presented to the liquid in the sump, as shown in dotted lines at 18 in FIG. 2, the full pressure of the compressed air acting on the liquid forces the liquid into the slots so the slots are filled with liquid under pressure. There will usually be a small amount of compressed air above the surface of the liquid in the slots so long as both ends 16 and 17 of the slots are between the seals 10 and 11. As soon as the ball rotates enough so that end 16 of the slots is slightly beyond the seal 11, as shown at 19 in FIG. 2, the trapped compressed air in the slots forcibly expels the liquid into the outlet. The small amount of compressed air trapped in slots which are not completely filled with liquid is therefore advantageous in cleaning the slots of any residue and the loss of air is negligible.

As shown in FIGS. 1 and 3, there is a spherical surface 20 between the slots 15 and spherical surfaces 22 and 23 on opposite sides of the slots 15 so that the seals 10, 11 are well supported while the ball 3 is rotated about its axis and the slots 15 are progressively brought into and out of contact with the seals. This eliminates leakage through the seals.

In the position shown in FIG. 1, seals 10 and 11 make contact with the upper and lower surfaces of the ball 3 in the regions defined by dotted line 24 and solid line 25 (FIG. 3). The seals 10 and 11 are the same size and are centered on the axis of the inlet and outlet 5 and 6. In this position the surface of the ball presented to the inlet 5 is subject to the compressed air system pressure and the portion of the ball 3 presented to the outlet 6 is subject to atmospheric pressure. The regions between the seals 10 and 11 are subject to a positive pressure above atmospheric pressure. As the ball 3 is rotated about the axis of spindle 8, liquid under system pressure is forced into the slots 8 until the ball reaches the position indicated by numeral 18 and the liquid forced into the slots is drained to atmospheric pressure when the ball reaches the position indicated by the numeral 19. The slots 15 are effective in draining liquid from the compressed air system without appreciable loss of compressed air, but the capacity of the slots is limited, and the rate of drainage of liquid is therefore low or small.

To increase the capacity of the drain valve, holes 26 were drilled on opposite sides of the ball 3. These holes were centered on the axis of rotation of the ball and were slightly inclined to the axis so that the inner ends of the holes intersected. (FIG. 4) The addition of the holes 26 to the slots 15 made a large increase in the volume available to receive liquid, but it did not make a large increase of the capacity of the valve because the liquid did not drain quickly from the valve. A large proportion of the liquid remained in the holes 26 and did not empty into the outlet. This defect was overcome by drilling an axially extending hole 27 through the lower ends of the cylindrical holes 26. The hole 27 is in a portion of the ball which is always between the upper and lower seals 10 and therefore at the time the cylindrical holes 26 are being filled with liquid, the axial hole is subject to the full compressed air system pressure and is likewise filled with liquid. As the cylindrical holes move to the drainage position, the pressure in the axial hole 27 acts initially to force the liquid out of the holes 26 and 27.

From another point of view, the axial hole 27 acts as a vent which prevents trapping of liquid in the holes 26.

The spherical surface 20 and the spherical surfaces 22, 23 outside the holes 26 provide adequate support for the seals 10, 11 in all positions of the ball.

The shape of the liquid receiving 26, 27 is not critical. In the structure shown, these cavities were formed as drilled holes. If the cavities have been formed by some other process, for example, by cores in a casting, other cross-sectional shapes could be used. The holes 26 could occupy the entire area between the medial spherical surface 20 and the inner diameter of the seal 10 without changing the function and mode of operation of the cavities. When viewed from the top as in FIG. 6, the holes 26 would then be generally semicylindrical in appearance on opposite sides of the medial spherical surface 20. A further modification of the FIGS. 4–6 structure would be to omit the slots 15 entirely and to rely solely on the cavities 26 and 27 for condensate collection. This would make only a very slight reduction in capacity and would not change the mode of operation. The omitted portions of the slots 15 would have very small fluid capacity as is evident from FIG. 6. The supporting action of the spherical strip 20 would be retained so that the seals 10, 11 would be adequately supported in the liquid receiving and liquid delivery positions of the ball.

FIGS. 7, 8 and 9 show a still further modification which still further increases the capacity of the ball by making the ball hollow. In this modification, where corresponding parts are indicated by the same reference symbols as in the previously described construction, the ball has the same spherical surfaces 20, 22, and 23 as in the ball of FIGS. 1–3, but in this case the slots 15 cut through the wall thickness of the ball so that the lower ends of the slots 15 are completely open and any liquid entering the outer ends of the slots immediately flows directly through the inner ends of the slots into the interior of the ball. Also the axial opening 27 merely cuts through the wall thickness of the ball. With this construction, the entire interior of the ball is available for receiving liquid which enters through the slots 15 in the uppermost position illustrated in FIG. 7 and starts to exit from the ball when the ball reaches the position indicated by dotted lines 19 in FIG. 8.

In operation, the motor 14 is started when the compressed air system is pressurized and runs continuously at a slow rate so long as the system is under pressure. During each revolution of the motor, the ball is rotated from a liquid collecting position to a liquid emptying position and back to the liquid collecting position. While the amount of liquid removed during each revolution of the shaft may be small, the cumulative results are enough to take care of any compressed air system. The amount of compressed air lost with this system is so small as to be negligible. There are not automatic drain valves to become stuck or otherwise disabled.

I claim:

1. In combination with a compressed air system and the like having a liquid collecting sump under the elevated pressure of the air system, a valve for draining the sump without substantial loss of air comprising a valve body having an inlet connected to receive liquid from the sump under said elevated air pressure and an outlet for said liquid to a lower pressure, a ball member rotatable on an axis in the body for blocking flow through the body in all angular positions of the member, means for continuously rotating the ball member on said axis, said member having openings spaced on opposite sides of a plane normal to said axis and through the center of the ball, said openings being presented to the inlet in a first angular position of the member to receive liquid from the inlet, said openings being presented to the outlet in a second angular position of the member to empty the liquid, a first annular seal concentric with the inlet for making sealing engagement with the ball around said openings in said first position, and a second annular seal spaced from the first seal and concentric with the outlet for making sealing engagement with the ball around said openings in said second position.

2. The combination of claim 1 in which the openings are circumferentially extending slots.

3. The combination of claim 2 in which the slots have semicircular bottoms.

4. The combination of claim 2 in which the width of the slots is generally the same as the spacing between the slots.

5. The combination of claim 2 in which the length of the openings in a circumferential direction is less than the spacing between the seals.

6. The combination of claim 1 in which an axially extending opening in the ball between said seals communicates at all times with said openings and with the space between said seals.

7. In combination with a compresssed air system and the like having a liquid collecting sump under the elevated pressure of the air system, a valve for draining the sump without substantial loss of air comprising a valve body, a ball member rotatable on an axis in the body for blocking flow through the body in all angular positions of the ball, said body having an inlet on one side of said axis connected to receive liquid from the sump under said elevated air pressure and an outlet on the opposite side of said axis for delivering said liquid to a lower pressure, means for continuously rotating said ball, said ball having a liquid holding cavity with an opening presented to the inlet in one angular position of the ball to receive liquid from the inlet and with said opening presented to the outlet in another angular position of the member to empty liquid into the outlet, a pair of annular seals between the ball and the body respectively spaced on said one and on said opposite side of said axis, and an axially extending opening from said cavity to the space between said seals.

8. The combination of claim 1 in which the openings are cylindrical holes.

9. The combination of claim 7 in which the ball is hollow.

10. The combination of claim 6 in which the ball is hollow.

11. The combination of claim 7 in which said axis is coaxial with said axially extending opening.

* * * * *